US007196610B2

(12) United States Patent
Straumann et al.

(10) Patent No.: US 7,196,610 B2

(45) Date of Patent: Mar. 27, 2007

(54) ACCESS CONTROL SYSTEM, ACCESS CONTROL METHOD AND DEVICES SUITABLE THEREFOR

(75) Inventors: Hugo Straumann, Obergosgen (CH); Felix Baessler, Bern (CH)

(73) Assignee: Swisscom AG, Bern (CH)

( * ) Notice: Subject to any disclaimer, the term of this patent is extended or adjusted under 35 U.S.C. 154(b) by 402 days.

(21) Appl. No.: 10/349,097

(22) Filed: Jan. 23, 2003

(65) Prior Publication Data

US 2003/0151493 A1 Aug. 14, 2003

(30) Foreign Application Priority Data

Feb. 13, 2002 (EP) ................................ 02405109

(51) Int. Cl.
*G05B 19/00* (2006.01)

(52) U.S. Cl. .............................. 340/5.61; 340/825.72; 340/825.69; 340/5.1; 340/5.2; 340/5.6; 340/5.8; 340/5.33; 340/5.5; 340/5.64; 340/10.1; 340/10.42

(58) Field of Classification Search ............... 340/5.61, 340/825.72, 825.69, 5.1, 5.2, 5.6, 5.8, 5.33, 340/5.5, 5.64, 10.1, 10.42
See application file for complete search history.

(56) References Cited

U.S. PATENT DOCUMENTS 4,727,368 A 2/1988 Larson et al.
4,786,900 A 11/1988 Karasawa et al.
4,829,296 A * 5/1989 Clark et al. ................ 340/5.65
5,475,375 A * 12/1995 Barrett et al. .............. 340/5.25
5,565,857 A 10/1996 Lee
6,072,402 A * 6/2000 Kniffin et al. ............. 340/5.28
6,581,161 B1 * 6/2003 Byford ....................... 713/182
6,772,331 B1 * 8/2004 Hind et al. ................. 713/151
7,024,395 B1 * 4/2006 McCown et al. ............. 705/65
2002/0153424 A1 * 10/2002 Li ............................. 235/492
2002/0180582 A1 * 12/2002 Nielsen ...................... 340/5.6

FOREIGN PATENT DOCUMENTS

WO WO 01/40605 6/2001
WO WO 01/63425 8/2001

OTHER PUBLICATIONS

A. Beutelspacher, Friedr. Vieweg & Sohn Verlagsgesellschaft MBH, XP-002209859, "KRYPTOLOGIE", pp. 82-85, 1996.

* cited by examiner

*Primary Examiner*—Brian Zimmerman
*Assistant Examiner*—Vernal Brown
(74) *Attorney, Agent, or Firm*—Oblon, Spivak, McClelland, Maier & Neustadt, P.C.

(57) ABSTRACT

An access control system comprises a plurality of access control devices in each of which is stored an access code. Specific access codes and access rights for a plurality of access control devices are transmitted from an access control central unit over a mobile radio network to the mobile communication terminal of a user. Transmitted to the mobile communication terminal by an access control device to be passed is an access control device identification. In the mobile communication terminal, on the basis of the received identification, the access code and the access rights for the access control device to be passed are determined, and are transmitted to the access control device. The access control device clears the user for access if the received access rights suffice and the received access code agrees with the stored access code.

10 Claims, 2 Drawing Sheets

ACCESS CONTROL SYSTEM, ACCESS CONTROL METHOD AND DEVICES SUITABLE THEREFOR

TECHNICAL FIELD

This invention relates to an access control system, an access control method and devices suitable therefor. The invention relates in particular to an access control system and an access control method in which an access code is stored in at least one mobile communication terminal, in which an access code, assigned to the respective access control device, is stored in each of a plurality of access control devices, and in which the mobile communication terminal and the access control devices include communication means for exchange of data between the mobile communication terminal and one of the access control devices.

BACKGROUND ART

Access control systems with a plurality of access control devices which control the access to access-controlled objects, for example access-controlled areas such as buildings, rooms or grounds, are known and are used, for instance, in hotels, company buildings and government buildings. In these known access control systems code carriers are handed out to the users, for example hotel guests or employees, in which code carriers a secret access code or an identification code is stored. The code carriers are designed, for example, as punch cards, magnetic cards, induction cards or chipcards, which transmit the access code stored thereon, or respectively the identification code, via an interface with contacts (mechanical or electrical) or via a contactless interface (by radio or infrared waves) to the access control device to be passed. In the access control device to be passed the received access code is compared with a secret access code stored in the access control device, or respectively the received identification code is transmitted by the access control device to an access control central unit for access authorization checking. In order to be able to change the secret access codes in the access control devices in a flexible and dynamic way, or respectively check the access authorization for an identification code in a centralized way, and in order to check further access conditions, such as authorized access time, authorized access day and/or authorized access date for the user, the access control devices in the known access control systems are connected to an access control central unit via fixed communication links. A drawback of these known access control systems is that a code carrier always has to be handed over or sent to the users personally, the sending entailing a security risk and therefore not being practiced, as a rule. During a change of code, the user must be given a new code carrier or an already handed out code carrier must be presented by the user at a service point for the code change. Moreover there is the disadvantage in the known access control systems that the administration of the access rights of the users or the sending of the access code to the users is always connected with an access control central unit. In the known access control systems therefore it is not possible to carry out the administration of the access rights of users to particular access-controlled objects in a plurality of access control central units independent of one another and/or to control the sending of the access code for these particular access-controlled objects to the users from a plurality of access control central units independent of one another.

Described in the patent application WO 01/63425 is an access control system for a hotel in which a secret code for a reserved hotel room is transmitted via a mobile radio network to a user to his mobile radio telephone and is stored there. According to WO 01/63425 the secret access code is transmitted from an access control central unit for the reserved point in time to the access control device of the reserved hotel room. To open the room door, the access code stored in the mobile radio telephone is transmitted via a wireless device interface to the access control device of the reserved hotel room. In the access control device, the received access code is compared with the access code stored there and, in the case of agreement, the electromechanical door lock of the room door is opened. In the access control system according to WO 01/63425, the access control device is networked with the access control central unit, which, on the one hand, entails a big investment in cabling, which increases the installation time and installation cost of the access control system and which, on the other hand, requires a corresponding communication module in each access control device, which increases the system costs.

Described in the patent application WO 01/40605 are an access control system and an access control method in which access rights for users and assigned access codes are administered and stored in an access control central unit. The access codes as well as indications such as security levels and access times are transmitted from the access control central unit over a telecommunication network to the respective access control devices. The access codes for the various access control devices are transmitted moreover from the access control central unit to the respective key devices, which can be designed as mobile communication terminals, for example mobile radio telephone. To pass an access control device, an access code stored in the key device is transmitted from there to the respective access control device, for example wirelessly. According to WO 01/63425, the access control devices must be designed for data communication with the access control central unit, which increases the system costs correspondingly. Moreover the user has to select the access code for the respective access control device from among several access codes stored in the key device, which entails a corresponding investment in time and which can be considered tedious by the user.

Described in the patent publication U.S. Pat. No. 5,565,857 is an access control system in which a plurality of user-specific access codes as well as an identification code in each case for the respective access control device are stored in the access control devices. According to U.S. Pat. No. 5,565,857, stored in the portable electronic key devices, which can be designed as mobile communication terminals, for example mobile radio telephones, are identification codes of a plurality of access control devices and assigned user-specific access codes. If a user with a key device is detected by the access control device, the identification code of the respective access control device is transmitted wirelessly to the key device. In the key device, the user-specific access code is determined which is stored, assigned to the received identification code of the access control device. The determined user-specific access code is transmitted from the key device wirelessly to the access control device, and is compared there with the stored user-specific access codes. In the access control system according to U.S. Pat. No. 5,565,857, the user-specific access codes are entered by an authorized user directly on location into the access control device, which is unsuitable for applications with several access control devices. In order to adapt the access control system according to U.S. Pat. No. 5,565,857 for applications with several access control devices, the access control devices would have to be networked with an access control central unit, which, on the one hand, entails a big investment in cabling, which increases the installation time and installation costs of the access control system, and, on the other hand, requires a corresponding communication module in each access control device, which increases the system costs.

DISCLOSURE OF INVENTION

It is the object of the present invention to propose an access control system and an access control method which do not have the drawbacks of the state of the art.

According to the present invention, these objects are achieved in particular through the elements of the independent claims. Further preferred embodiments follow moreover from the dependent claims and the description.

The access control system comprises a plurality of access control devices, in each of which is stored an access code assigned to the respective access control device, and at least one mobile communication terminal in which an access code is stored. The mobile communication terminal and the access control devices include communication means for exchange of data between the mobile communication terminal and one of the access control devices.

The above-mentioned objects are achieved through the invention in particular in that the access control devices each comprise an identification module for transmission of an access control device identification stored in the access control device to the mobile communication terminal, and in that the mobile communication terminal comprises an access authorization module in which are stored access control device identifications and access codes of a plurality of access control devices, the access code for a respective access control device being stored in each case assigned to the access control device identification of this respective access control device. It is thereby made possible for the mobile communication terminal to be used as the code carrier for access to a plurality of access-controlled areas, it being possible to assign different access codes to the access control devices which control the access to an area, and it being possible to determine dynamically in the mobile communication terminal the access code for the access control device to be passed, on the basis of the access control device identification received from the access control device to be passed. In an advantageous way, the access for a user can thus be controlled to a plurality of access-controlled objects without the access control devices having to be networked with an access control central unit and without the users having to be handed out one or more code carriers.

According to the invention, access rights data, assigned to an access control device identification, are stored in each case in the access authorization module, which access rights data define access rights of the user of the mobile communication terminal for the access control device determined through the respective access control device identification. Through the storing of access rights in the mobile communication terminal, the storing of access rights in the access control device becomes unnecessary, or respectively the calling up of these access rights in an access control central unit by the access control device over a communication link. The checking of the access rights, after their prior transmission, from the mobile communication terminal to the access control device, is undertaken in the access control device. In an advantageous way, therefore, specific access rights of a user, such as authorized access times, authorized access days and/or authorized access calendar dates, can be checked for a plurality of access control devices without the access control devices having to be networked with an access control central unit.

The mobile communication terminal preferably comprises a request module for preparing a request record to be transmitted to an access control device to be passed, which request record comprises a digital certificate and the access rights data, which define the access rights of the user for the access control device to be passed, the digital certificate being generated by the request module based on the access code assigned to the access control device to be passed. Thereby, on the one hand, it is ensured that the access code for the access control device to be passed is not transmitted in unencrypted, transparent form, and, on the other hand, it is achieved that the access rights of the respective user for the access control device to be passed can be checked by the access control device to be passed.

The access control devices preferably each comprise an access control module for generating a second digital certificate from the access rights data, contained in the received request record, and from the access code stored in the access control device to be passed, for comparing the second digital certificate with the digital certificate contained in the received request record, for checking the received access rights data, and, in the case of agreement of the digital certificates and sufficient access rights, for clearing access. In this preferred embodiment variant, the digital certificate generated in the mobile communication terminal is also generated by the request module from the access code and from the access rights data of the user. Consequently not only can the validity of the access code be checked in the access control device on the basis of the second digital certificate, but also the agreement of the access rights data transmitted openly by the mobile communication terminal with the access rights data used by the mobile communication terminal for the generation of the digital certificate, so that a manipulation of the openly transmitted access rights data can be detected.

In an embodiment variant, the access control devices each comprise a time determination module for determining current time indications, such as the clock time, the day of the week and/or the date, and an access control module for comparing the determined current time indications with access rights data on authorized access times which are received from the mobile communication terminal. The specific, time-limited access rights of a user can thereby be controlled directly in the access control devices without the access control devices having to be networked with a time center.

The access control system preferably comprises an access control central unit for transmission, over a mobile radio network to the mobile communication terminal, of access control device identifications and access codes and access rights data, assigned in each case to these access control device identifications. The access rights data define the access rights of the user of the mobile communication terminal for an access control device. The access authorization module is thereby designed such that it stores the received access control device identifications, access codes and access rights data correspondingly assigned to one another. In an advantageous way, the access rights for users can thereby be administered centrally, current access rights and access codes can be loaded dynamically on code carriers, i.e. mobile communication terminals, of the users without code carriers having to be presented at a service point, handed out or delivered by mail, and without the access control devices having to be networked with an access control central unit. Since in particular the mobile radio networks for mobile radio telephony are networked with one another via switching points and the public switched telephone network worldwide, on the one hand the access codes and access rights data can be delivered to users worldwide, and, on the other hand, the access codes and access rights data for access control devices in various buildings, cities and countries can be administered in the access control central unit. It is also possible for the access control system to comprise a plurality of such access control central units, which are independent of one another, so that the administration of the access rights of the users to particular access-controlled objects can be carried out in a plurality of access control central units independent of one another and/or that the delivery of the access code for these particular access-controlled objects can be transmitted to the users from a plurality of access control central units independent of one another.

Besides an access control system and an access control method, the present invention also relates to a computer program product, suitable therefor, for controlling a processor of a mobile communication terminal and an access control device suitable therefor.

BRIEF DESCRIPTION OF THE DRAWING

An embodiment of the present invention will be described in the following with reference to an example. The example of the embodiment is illustrated by the following attached figures.

MODES FOR CARRYING OUT THE INVENTION

Figure 1:
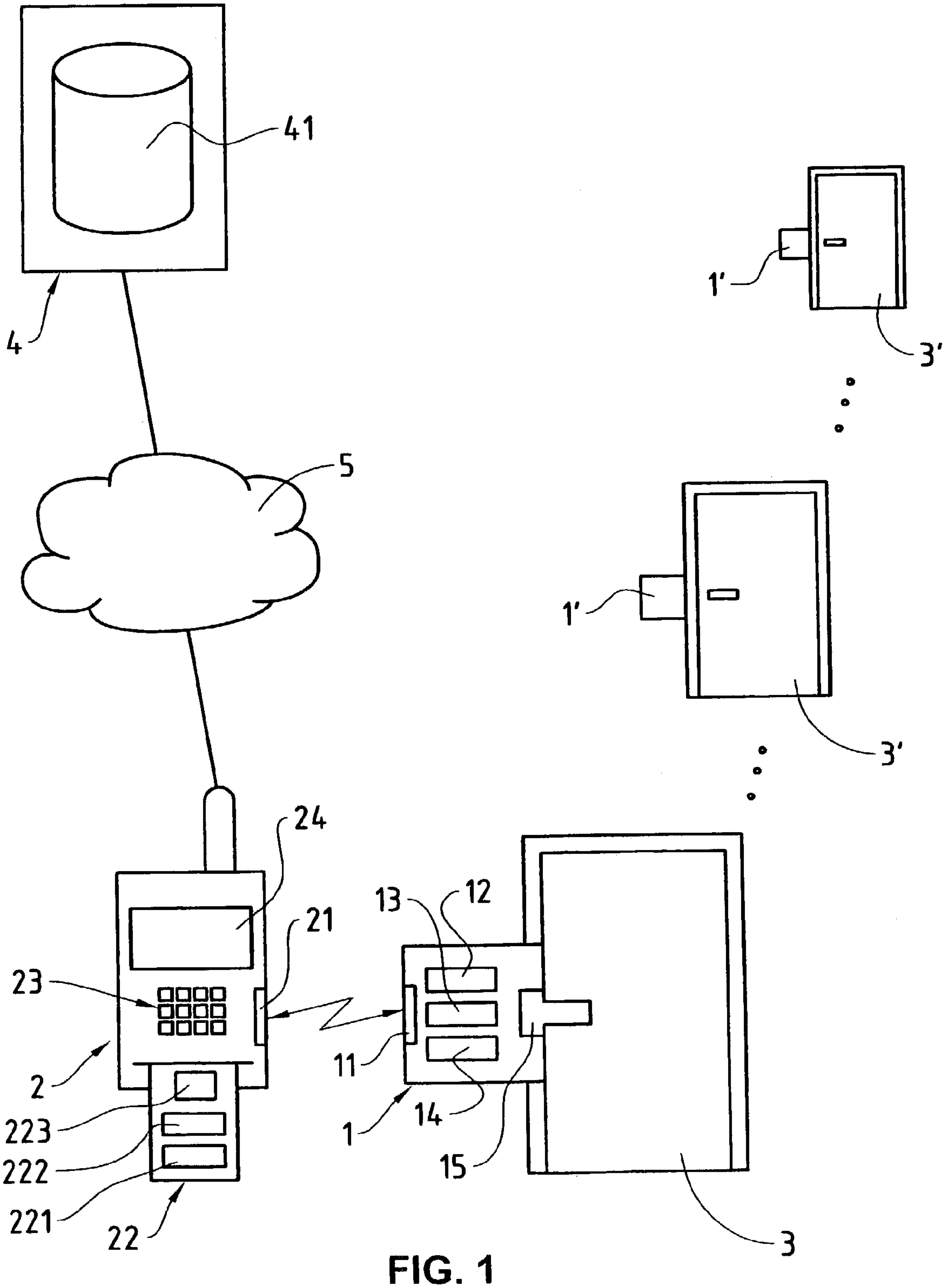
FIG. 1 shows a block diagram illustrating schematically an access control system with an access control central unit, a mobile communication terminal and a plurality of access control devices.

In FIG. 1, the reference numeral 1 refers to an access control device which denies access or clears access for a user to controlled areas in that it opens the access door 3 or keeps it closed. To this end, the access control device 1 is connected to an electromechanical lock 15. As indicated in FIG. 1, the access control system comprises a plurality of access control devices 1, 1' which control access doors 3, 3', only the access control device 1 being shown in detail. It should be made clear here that the access control system according to the invention, or respectively the access control method, can be used not only for control of the access to areas through access doors, but also for access control, or respectively admittance control, to other objects, such as machines, PCs (Personal Computers) or other technical devices and systems. In the latter applications the clearance of access, or respectively admittance, by the access control devices 1 typically takes place not by opening an electromechanical lock 15, but rather by giving access to a programmed software program or software switch or by setting a corresponding flag.

The access control device 1 comprises a communication module 11 for data communication over short distances (e.g. in an area of one to some meters) with external communication terminals 2 outside the access device 1. The communication module 11 preferably comprises a transceiver for wireless data communication by means of electromagnetic waves, in particular radio or infrared waves, for example an IrDA infrared interface (Infrared Data Association) or a Bluetooth radio interface or another device interface.

The access control device 1 includes in addition an identification module 12, which comprises a data store in which an access control device identification is stored. The access control device identification is preferably structured hierarchically, and comprises, for example, an area code (e.g. four bytes), a building code (e.g. five bytes) and a device code (e.g. four bytes). The identification module 12 further comprises a programmed software module which controls a processor of the access control device 1 in such a way that the stored access control device identification is transmitted via the communication module 11 when the presence of an external communication terminal 2 is detected by the communication module 11.

The access control device 1 further comprises a time determination module 14 for determining current time indications, such as the current time of day, day of the week and date. The time determination module 14 is designed as a programmed software module or as a hardware circuit, and is clocked through a quartz crystal, for example.

The access control device 1 further comprises an access control module 13, comprising programmed software modules and/or corresponding hardware circuits, for generating a cryptographic, digital certificate from a secret code stored in the access control device 1 and from data which are received via the communication module 11, for comparing the generated digital certificate with a digital certificate received via the communication module 11, for checking access rights data, received via the communication module 11, and, with agreement of the digital certificates and sufficient access rights, for clearing access. In checking the access rights data, the indicated access rights are compared in particular with the current time indications determined through the time determination module 14. The access control module 13 comprises moreover hardware and/or software components for generating a random number. It should be mentioned here that a plurality of secret access codes can be stored in the access control device 1, to each of which a period of validity or an expiration date is assigned, whereby the current valid access code can be automatically changed in the access control device 1 without a networking with the access control central unit 4 being necessary for that purpose.

Optionally, the access control device 1 comprises a log module (not shown), which is preferably designed as a programmed software module and comprises a log file in which programmed software functions of the log module store data on accesses, or respectively access attempts, to the respective access control device 1, as will be described in more detail later on.

The mobile communication terminal 2 is, for example, a mobile radio telephone or a laptop or palmtop computer, which comprise in each case mobile radio components for communication over the mobile radio network 5. The mobile radio network 5 is, for instance, a GSM (Global System for Mobile Communications) or UMTS (Universal Mobile Telephone System) network or another, e.g. satellite-based, mobile radio network. The mobile communication terminal 2 comprises moreover a communication module 21, corresponding to the communication module 11, for data exchange with the access control devices 1.

As is shown schematically in FIG. 1, the mobile communication terminal 2 comprises a processor 223, an access authorization module 221 as well as a request module 222. The processor 223, the access authorization module 221 and/or the request module 222 are implemented on a chipcard 22, for example. The chipcard 22 is preferably an SIM card (Subscriber Identification Module) which is removably connected to the mobile communication terminal 2.

The access authorization module 221 comprises a data store in which access control device identifications are stored for a plurality of access control devices 1. Stored, assigned in each case to the access control device identification for an access control device 1, in the data store of the access authorization module 221 are the access code (e.g. twelve bytes) for the respective access control device 1 and access rights data, which define the access rights of the user of the mobile communication terminal 2. The access rights data define time periods during which the user can be granted access to the object controlled by the respective access control device 1. Time periods are defined, for example, by a starting time and an ending time (e.g. each two bytes), a day of the week (e.g. one byte) and/or a date (e.g. three bytes). The access rights data comprise moreover an expiration date (e.g. three bytes), after which the user is supposed to be denied access. A PIN code (Personal Identification Number, e.g. four bytes), a user identification (e.g. seven bytes) as well as a company code (e.g. six bytes) can also be stored in the data store of the access authorization module 221. The data stored in the data store of the access authorization module 221 are write-protected, and cannot be changed by the user; moreover, the access codes and the PIN code cannot be read by the user.

The request module 222 is preferably designed as a software module which controls the processor 223 of the mobile communication terminal 2 in such a way that it activates the communication module 21 and prepares a request record for transmission to the access control device 1 to be passed. The activation of the communication module 21 and the preparation of the request record take place upon command of the user, for instance by actuation of a defined function key of the operating elements 23. With the activation electromagnetic waves are emitted by the communication module 21, either according to the activation procedure corresponding to the standards of the device interface used or through periodic transmission of defined data packets. To increase security, the activation of the communication module 21 and the preparation of the request record can take place only after correct entry of the above-mentioned PIN code. The request record comprises a cryptographic, digital certificate which is calculated by the request module 22 from the access rights data and the access code for the access control device 1 to be passed, as well as the access rights data for the access control device 1 to be passed.

As is shown schematically in FIG. 1, the access control system comprises an access control central unit 4 with an access rights database 41. Assigned to the users in the access rights database 41 in each case is a user identification, a company code, a call number for their mobile communication terminal 2 as well as access rights data for the access control devices 1 to which they have access rights. If the user identification, the company code or the access rights data of a user are newly entered or changed in the access rights database 41, a corresponding updating of the access authorization module 221 takes place in the mobile communication terminal 2 of the user. The current access control device identifications with the assigned access codes and access rights data are thereby transmitted from the access control center 4 over the mobile radio network 5 to the mobile communication terminal 2, for example by means of SMS messages (Short Message Services). The current data are received in the mobile communication terminal 2 by the access authorization module 221, and, as described above, are stored in the data store of the access authorization module 221.

One skilled in the art will understand that programmed software modules which are mentioned in the description can also be implemented wholly or partially through hardware.

Figure 2:
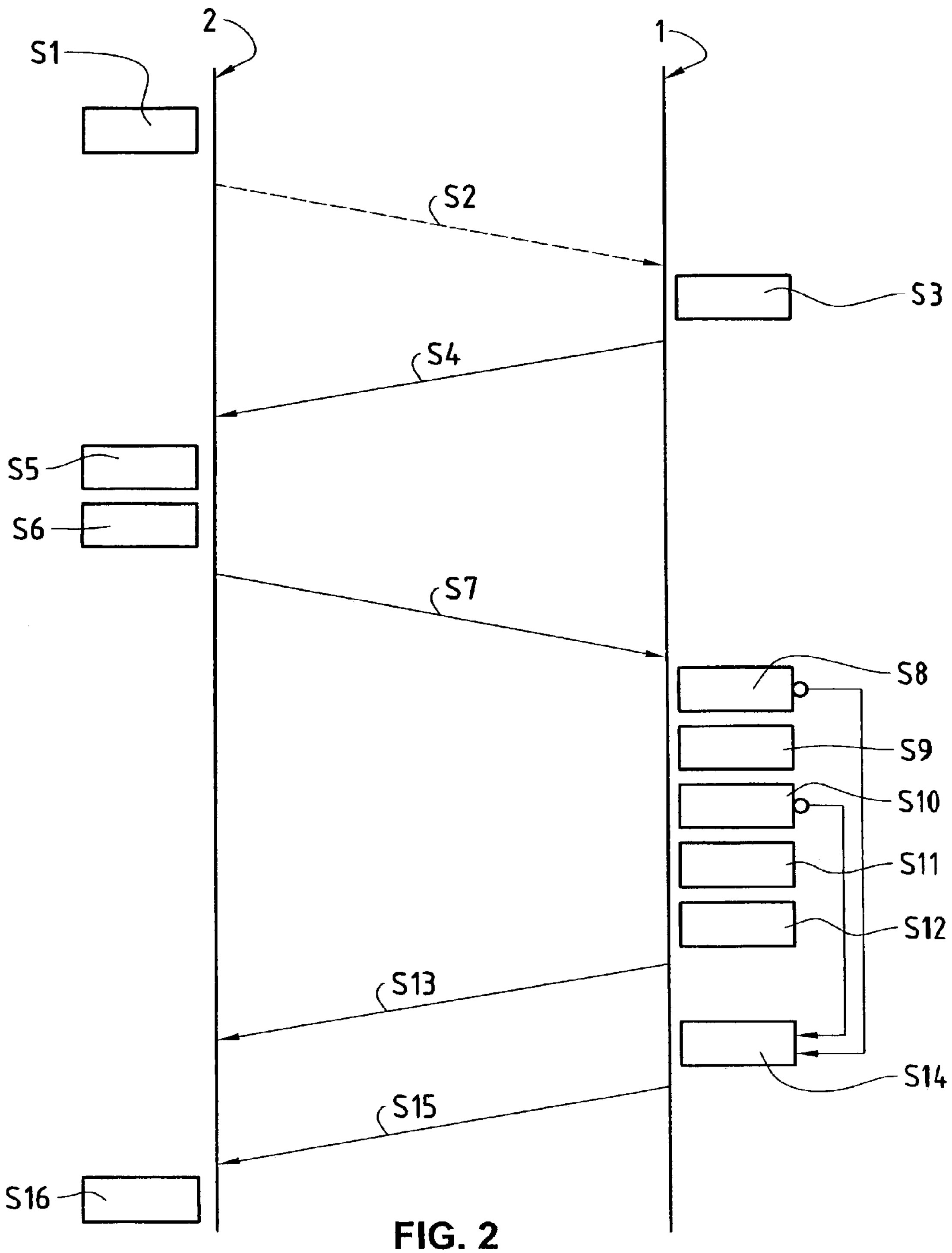
FIG. 2 shows a flow chart illustrating schematically the sequence of steps during the access control and the data exchange relating thereto between a mobile communication terminal and an access control device.

The course of the access control will be described in the following paragraphs with reference to FIG. 2.

In step S1, as mentioned above in connection with the request module 222, the communication module 21 is activated by the user of the mobile communication terminal 2 in the vicinity of the access control device 1 to be passed.

In step S2, electromagnetic waves are emitted by the activated communication module 21 which are detected in the access control device 1 to be passed.

In step S3, a random number (e.g. eight bytes) is generated in the access control device 1 by the access control module 13 and is temporarily stored in the access control device 1.

In step S4, the generated random number and the access control device identification for the access control device 1 are transmitted by means of the communication module 11 to the mobile communication terminal 2 and are received and temporarily stored there by the communication module 21.

In step S5, the access code and the access rights data are determined by the request module 222 in the access authorization module 221, which access code and access rights data are assigned to the access control device identification received in step S4, In step S6, the request module 222 generates a cryptographic, digital certificate from the received, temporarily stored random number, from the determined access code, from the determined access rights data as well as from the user identification stored in the mobile communication terminal 2 and the company code.

In step S7, the generated digital certificate, the determined access rights data as well as the user identification and the company code are transmitted by means of the communication module 21 to the access control device 1 and are received and temporarily stored there by the communication module 11.

In step S8, the access rights data received in step S7 are checked by the access control module 13. Checked thereby is whether the current time indications determined by the time determination module 14 lie within the time ranges, defined through the received access rights data, during which the user has access to the object controlled by the access control device 1. If the user has no access at the current point in time, the access control by the access control device ends in step S14.

In step S9, a second cryptographic, digital certificate is generated in the access control device 1 by the access control module 13 from the random number, generated in step S3, from the access code stored in the access control device 1 and from the access rights data, user identification and company code, received in step S7.

In step S10, the digital certificate received in step S7 is compared with the digital certificate generated in step S9. If the two digital certificates do not agree, no access is granted to the user, and the access control by the access control device 1 ends in step S14.

In step S11, access is cleared for the user, and, in the present example, the electromechanical lock 15 of the access door 3 is opened.

In step S12, the access control by the access control device 1 ends, temporarily stored data are erased, a positive acknowledgement message is generated, and, optionally, the user identification received in step S7 and the company code are stored together with a positive flag in a log file of the access control device 1.

In step S13, the positive acknowledgement message is transmitted by means of the communication module 11 to the mobile communication terminal 2, where it is received by the communication module 21 and is shown on the display 24.

In step S14, the access control by the access control device 1 ends, temporarily stored data are erased, a negative acknowledgement message is generated, and, optionally, the user identification received in step S7 and the company code are stored together with a negative flag in a log file of the access control device 1.

In step S15, the negative acknowledgement message is transmitted by means of the communication module 11 to the mobile communication terminal 2, where it is received by the communication module 21 and is shown on the display 24.

In step S16, the request by the mobile communication terminal 2 ends after receipt of an acknowledgement message or after expiration of a defined time period from the transmission of the request record in step S7, and temporarily stored data are erased.

INDUSTRIAL APPLICABILITY

The present invention makes it possible to control the access, or respectively admittance, to buildings, rooms, grounds, or machines, PCs (Personal Computer) and other technical devices and systems.

The invention claimed is:

1. An access control method, in which an access code is assigned to an access control device and is stored in the access control device, in which an access code is stored in a mobile communication terminal, in which a unique access control device identification for each access control device, stored in each respective access control device, is transmitted from the access control device to the mobile communication terminal, and in which the access code for the access control device is determined in the mobile communication terminal, in that the access code is determined which is stored, assigned to the received unique access control device identification, in the mobile communication terminal, comprising:

generating a first digital certificate in the mobile communication terminal based on the determined access code and on access rights data, which are stored, assigned to the received unique access control device identification, in the mobile communication terminal, and which define access rights of the user for the access control device, transmitting the first digital certificate from the mobile communication terminal together with the access rights data to the access control device, generating a second digital certificate in the access control device based on the received access rights data and on the access code stored in the access control device, comparing the generated second digital certificate with the received first digital certificate, checking the received access rights data in the access control device, and clearing access upon agreement of the digital certificates and with sufficient access right.

2. The access control method according to claim 1, further comprising:

generating and temporarily storing a random number in the access control device;

transmitting the random number from the access control device to the mobile communication terminal;

generating the first digital certificate in the mobile communication terminal based on the determined access code, on the access rights data stored in the mobile communication terminal and on the received random number; and generating the second digital certificate in the access control device based on the received access rights data, on the access code stored in the access control device and on the temporarily stored random number.

3. The access control method according to claim 1, further comprising:

determining current time indications in the access control device; and comparing the determined current time indications with the access rights data on authorized access times which are received from the mobile communication terminal.

4. The access control method according to claim 1, further comprising:

transmitting unique access control device identifications along with access codes and access rights data that are assigned to the unique access control device identifications from an access control central unit via a mobile radio network to the mobile communication terminal, the access fights data defining access fights of the user of the mobile communication terminal for an access control device; and storing the received unique access control device identifications, access codes and access rights data in the mobile communication terminal correspondingly assigned to one another.

5. A computer program product comprising:

a tangible computer readable medium with computer program code means contained therein for control of a processor of a mobile communication terminal, said tangible computer readable medium comprising, means for controlling exchange of data with an access control device to receive and accept a unique access control device identification for each access control device which is transmitted from a respective access control device to be passed, to determine an access code for the access control device to be passed in the mobile communication terminal, to assign the determined access code to the received unique access control device identification, and to store the determined access code in the mobile communication terminal, and means for controlling the processor of the mobile communication terminal to generate a digital certificate in the mobile communication terminal based on the determined access code and access rights data which are stored and assigned to the received unique access control device identification in the mobile communication terminal, and to define access rights of the user of the mobile communication terminal for the access control device to be passed, wherein the generated digital certificate is transmitted from the mobile communication terminal together with the access rights data to the access control device to be passed.

6. The computer program product according to claim 5, further comprising:

computer program code means for controlling the processor of the mobile communication terminal to receive a random number which is transmitted from the access control device to be passed, and to generate the digital certificate in the mobile communication terminal based on the determined access code, on the access rights data stored in the mobile communication terminal and on the received random number.

7. The computer program product according to claim 5, further comprising:

computer program code means for controlling the processor of the mobile communication terminal to receive from the access control central unit unique access control device identifications and access codes and access rights data, assigned in each case to the unique access control device identifications, the access rights data defining access rights of the user of the mobile communication terminal for an access control device, and to store the received unique access control device identifications, access codes and access rights data in the mobile communication terminal correspondingly assigned to one another.

8. An access control device in which an access code is stored, comprising:

communication means for exchange of data with a mobile communication terminal, and which comprises an identification module for transmitting a unique access control device identification for each access control device, stored in each respective access control device, to the mobile communication terminal;

means for receiving access rights data and a first digital certificate from the mobile communication terminal, which access rights data define access rights of the user of the mobile control device; and an access control module configured to generate a second digital certificate based on the access rights data which have been received from the mobile communication terminal, and on the access code which is stored in the access control device, wherein the access control module is configured to compare the generated second digital certificate with the received first digital certificate and to check the received access rights data, and the access control module is configured to clear access upon agreement of the digital certificates and with sufficient access right.

9. The access control device according to claim 8, wherein the access control module is configured to generate and temporarily store a random number, the access control device comprises means for transmitting the temporarily stored random number to the mobile communication terminal together with the unique access control identification, and the access control module is configured to generate a second digital certificate based on the received access rights data, on the access code stored in the access control device, and on the temporarily stored random number.

10. The access control device according to claim 8, further comprising:

a time determination module for determining current time indications, wherein the access control module is configured to compare the determined current time indications with access rights data on authorized access times which have been received from the mobile communication terminal.

* * * * *